US 11,971,278 B2

(12) United States Patent
Kinashi (10) Patent No.: US 11,971,278 B2
(45) Date of Patent: Apr. 30, 2024

(54) VARIABLE RELUCTANCE TYPE RESOLVER

(71) Applicant: ICHINOMIYA DENKI CO., LTD., Shisou (JP)

(72) Inventor: Yoshikazu Kinashi, Shisou (JP)

(73) Assignee: ICHINOMIYA DENKI CO., LTD., Shisou (JP)

( * ) Notice: Subject to any disclaimer, the term of this patent is extended or adjusted under 35 U.S.C. 154(b) by 143 days.

(21) Appl. No.: 17/570,750

(22) Filed: Jan. 7, 2022

(65) Prior Publication Data

US 2022/0276073 A1 Sep. 1, 2022

(30) Foreign Application Priority Data

Feb. 26, 2021 (JP) .................................. 2021-030575

(51) Int. Cl.
| | |
|---|---|
| *G01D 5/20* | (2006.01) |
| *G01B 7/30* | (2006.01) |
| *H02K 3/12* | (2006.01) |
| *H02P 25/08* | (2016.01) |

(52) U.S. Cl.
CPC ............... *G01D 5/20* (2013.01); *G01B 7/30* (2013.01); *H02K 3/12* (2013.01); *H02P 25/08* (2013.01)

(58) Field of Classification Search
CPC .............................................. H02K 11/20–23
USPC ............................................. 310/66, 156.05
See application file for complete search history.

(56) References Cited

U.S. PATENT DOCUMENTS

2021/0310832 A1*  10/2021  Park ....................... H02K 11/21

FOREIGN PATENT DOCUMENTS

| JP | 2013-217852 A | 10/2013 |
| JP | 2015-040806 A | 3/2015 |
| JP | 2015040806 A * | 3/2015 |
| JP | 2018-078755 A | 5/2018 |
| JP | 2018078755 A * | 5/2018 |

OTHER PUBLICATIONS

Machine translation of JP-2018078755-A (Year: 2018).*
Machine translation of JP-2015040806-A (Year: 2015).*

* cited by examiner

*Primary Examiner* — Quyen P Leung
*Assistant Examiner* — Minki Chang
(74) *Attorney, Agent, or Firm* — Jordan and Koda, PLLC; Steven P. Koda, Esq.

(57) ABSTRACT

Among eight teeth pairs, one teeth pair is a non-use teeth pair around which an exciting coil is not wound, and other seven teeth pairs are use teeth pairs around which the exciting coil is wound zero or more times. The number Wa of windings of the exciting coil wound around the tooth included in the use teeth pair in a 90° positional relationship with respect to the non-use teeth pair and the number Wb of windings of the exciting coil wound around the tooth included in the use teeth pair in a positional relationship other than the 90° positional relationship with respect to the non-use teeth pair satisfy a relationship of $0 \leq Wa \leq 0.5Wb$. The number Wa of windings and the number Wb of windings may satisfy a relationship of $0 < Wa \leq 0.5Wb$.

4 Claims, 8 Drawing Sheets

Related Art

VARIABLE RELUCTANCE TYPE RESOLVER

BACKGROUND OF THE INVENTION

Field of the Invention

The present invention relates to a variable reluctance type resolver.

Description of the Related Art

Conventionally, a rotation angle sensor detecting a rotation angle of a rotating body is known. The rotation angle sensor has a wide range of applications and is used for a wheel speed sensor, a steering angle sensor of a steering wheel, and the like in an automobile power system, for example. The rotation angle sensor is also used for rotary drive units of a robot, conveyance equipment, and the like, index tables of an automatic assembling machine, a measuring machine, and the like, and machining indexes of an NC machine tool, a special-purpose machine, and the like, for example. The rotation angle sensor used in severe environments is required to have high environmental resistance. For example, an optical encoder and a magnetic encoder that have been conventionally used for the rotation angle sensor are susceptible to temperature changes and electromagnetic fields, and have low environmental resistance. Resolvers are mentioned as the rotation angle sensor realizing high environmental resistance. A variable reluctance type resolver (hereinafter referred to as a "VR type resolver") is known as one of the resolvers.

The VR type resolver outputs voltages according to the rotation angle, utilizing changes in magnetic resistance (reluctance) with the rotation of a resolver rotor. In a common VR type resolver, an exciting coil and two output coils are wound around each tooth of an annular resolver stator. Inside the resolver stator, the resolver rotor is arranged. The resolver rotor has a different distance (magnetic gap) from each tooth in the circumferential direction. The exciting coil generates a magnetic field by the flow of a current and forms a magnetic path between the exciting coil and the adjacent resolver rotor. Strength of the magnetic field changes by the rotation of the resolver rotor. The output coils output voltages based on the strength of the magnetic field.

When the resolver rotor rotates, the magnetic resistance in the magnetic path changes, and the voltages output by the two output coils change in sine wave-like or cosine wave-like. During one rotation of the resolver rotor, the two output coils output sine wave-like or cosine wave-like voltages. The voltages output by the two output coils are signal-processed by an external signal processing circuit, for example, so that the rotation speed, the rotation angle, and the like of the resolver rotor are calculated.

Various kinds of VR type resolvers are distinguished by being referred to as "nX", where the number of cycles in the sine wave-like or cosine wave-like voltages output during one rotation of the resolver rotor is referred to as a multiplication factor n of angle. For example, a VR type resolver outputting the sine wave-like or cosine wave-like voltages with two cycles during one rotation of the resolver rotor is referred to as "2×". The multiplication factor n of angle is determined by the shape of the resolver rotor. Hereinafter, the number of slots (number of teeth) of the resolver stator is referred to as N.

Japanese Patent Application Laid-Open No. 2013-217852 (Patent Literature 1) discloses an example of such a VR type resolver. Japanese Patent Application Laid-Open No. 2018-78755 (Patent Literature 2) discloses examples of various kinds of VR type resolvers each including two teeth around which the exciting coil and the two output coils are not wound.

When the resolver is arranged close to the motor, magnetic field generated by a magnet of a motor rotor affects the resolver rotor, causing the following problems.

Figure 6:
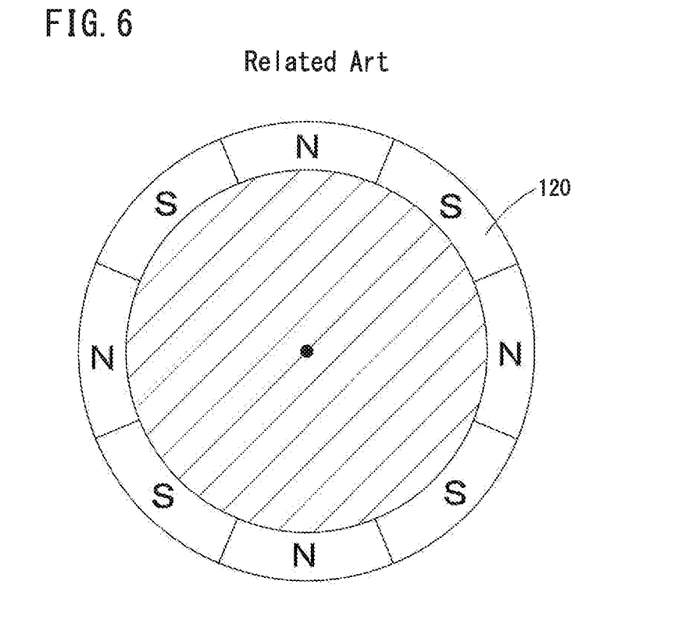
FIG. 6 is a schematic diagram of a motor rotor of a motor provided with a conventional resolver.

As illustrated in FIG. 6, a magnet 120 alternately generating N poles and S poles along the circumferential direction is arranged in a motor rotor. When the number M of magnetic poles of the motor rotor satisfies a relationship of M=2m (m: even number), the magnetic poles in the motor rotor are arranged in point symmetry with respect to an axial core of a motor shaft. In short, the N poles or the S poles are arranged in point symmetry at any position in the circumferential direction of the motor rotor.

Figure 7:
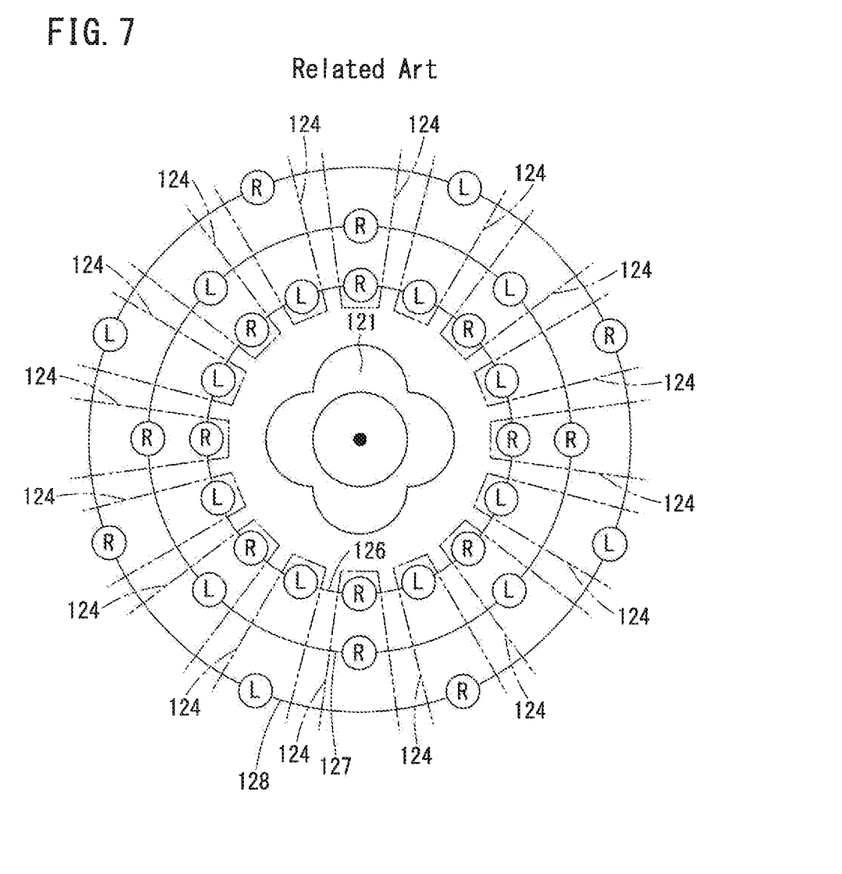
FIG. 7 is a schematic diagram illustrating magnetic poles formed by an exciting coil 126, a first output coil 127, and a second output coil 128 in the conventional resolver.

As illustrated in FIG. 7, the shape of a resolver rotor 121 is point symmetric with respect to the axial core of the motor shaft, and the arrangement of the winding directions of an exciting coil 126 is also point symmetric with respect to the axial core of the motor shaft. A circled letter R and a circled letter L indicate winding directions of winding parts of the exciting coil 126 wound around each tooth 124. When the teeth 124 are seen outward from the resolver rotor 121, the winding direction of the winding part indicated by the letter R is a clockwise direction, and the winding direction of the winding part indicated by the letter L is a counterclockwise direction, for example. Therefore, the arrangement of the magnetic poles generated by the exciting coil 126 is also point symmetric with respect to the axial core of the motor shaft. In short, the N poles or the S poles are generated in point symmetry at any position in the circumferential direction of the resolver rotor.

The magnetic field generated by the motor rotor described above is a magnetic field where the magnetic poles alternate along the circumferential direction and the same magnetic poles are arranged in point symmetry. When the distance from the motor rotor to the resolver rotor is small, the same magnetic poles as the magnetic poles generated by the magnet of the motor rotor are generated in the resolver rotor. As a result, in the resolver rotor, the same magnetic poles are arranged in point symmetry by the magnet of the motor rotor.

When the motor rotor and the resolver described above are closely arranged, the magnetic field generated by the motor rotor is superimposed on the magnetic field generated by the exciting coil. Both the magnetic field generated by the motor rotor and the magnetic field generated by the exciting coil are magnetic fields where the same magnetic poles are arranged in point symmetry. Therefore, the magnetic field generated by the exciting coil is uniformly strengthened or weakened by the magnetic field generated by the motor rotor. As a result, induced voltages generated in the output coils include an induced voltage from the magnetic field generated by the motor rotor. Therefore, the magnetic field generated by the motor rotor causes electrical error. In particular, the induced voltage by the magnetic field of the magnet of the motor rotor increases with an increase in the rotation speed of the motor rotor. Therefore, the electrical error increases with the increase in the rotation speed of the motor rotor.

Figure 8:
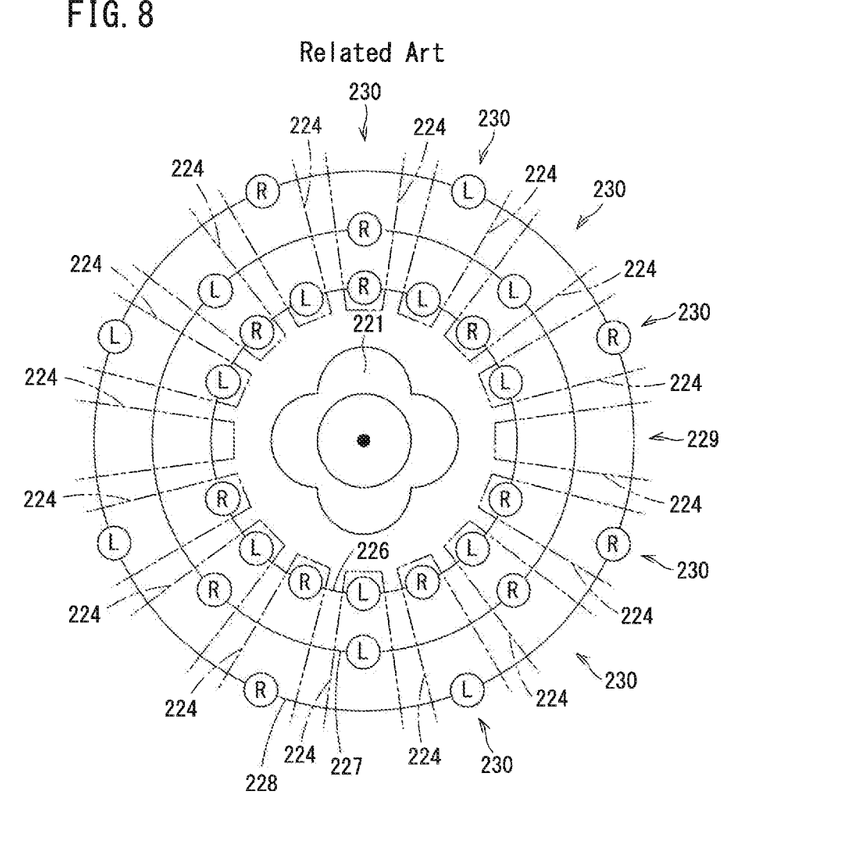
FIG. 8 is a schematic diagram illustrating magnetic poles formed by an exciting coil 226, a first output coil 227, and a second output coil 228 in a resolver described in Patent Literature 2.

As illustrated in FIG. 8, in the VR type resolver described in a first embodiment of Patent Literature 2, a resolver rotor 221 has four projections radially projecting from the axial core, corresponding to the multiplication factor of angle of 4. Among eight teeth pairs consisting of sixteen teeth 224, one teeth pair is a non-use teeth pair 229 around which an exciting coil 226, a first output coil 227, and a second output coil 228 are not wound, and the other seven teeth pairs are use teeth pairs 230 around which the exciting coil 226 and the first output coil 227 or the second output coil 228 are wound. According to the VR type resolver illustrated in FIG. 8, even when the magnetic field of the motor rotor where the same magnetic poles are arranged in point symmetry is superimposed on the magnetic field generated by the exciting coil 226, the electrical error can be prevented from occurring.

The resolver detects the rotation angle of the rotating body, utilizing the property that the magnetic resistance changes according to the rotor position. Therefore, it is assumed that the total magnetic resistance of the exciting coil (i.e., total impedance of the exciting coil) is constant in the resolver. However, when a resolver having the multiplication factor n of angle of two is configured by a method described in Patent Literature 2, the total impedance of the exciting coil varies depending on the rotor position. Therefore, although the current flowing through the exciting coil should be constant regardless of the rotor position, the current varies depending on the rotor position in fact. Therefore, the magnetic field of the exciting coil and the output voltages of the resolver also vary depending on the rotor position, resulting in occurrence of the electrical error.

SUMMARY OF THE INVENTION

The present invention has been made in view of the above-described circumstances. It is an object of the present invention to provide a resolver not causing electrical error even when a magnetic field of a motor rotor where the same magnetic poles are arranged in point symmetry is superimposed on a magnetic field generated by an exciting coil, capable of reducing a variation in the total impedance of the exciting coil according to the rotor position, and having a multiplication factor of angle of two.

(1) A variable reluctance type resolver according to the present invention is provided in a motor in which a number M of magnetic poles of a motor rotor satisfies a relationship of M=2m, m being an even number, and has a multiplication factor of angle of two. The variable reluctance type resolver includes: a rotor mounted coaxially with a motor shaft; a stator having sixteen teeth; and an exciting coil, a first output coil, and a second output coil selectively wound around the sixteen teeth. The sixteen teeth include eight teeth pairs. Each of the teeth pairs includes two teeth in a point symmetric positional relationship with respect to an axial core of the rotor. Among the eight teeth pairs, one teeth pair is a non-use teeth pair around which the exciting coil is not wound, and other seven teeth pairs are use teeth pairs around which the exciting coil is wound zero or more times. The exciting coil is wound in directions opposite to each other around the two teeth included in the use teeth pair so as to generate different magnetic poles. The exciting coil is wound in directions opposite to each other around two teeth adjacent to each other along a circumferential direction of the axial core, among the teeth included in the use teeth pairs. A number Wa of windings of the exciting coil wound around the tooth included in the use teeth pair in a 90° positional relationship with respect to the non-use teeth pair and a number Wb of windings of the exciting coil wound around the tooth included in the use teeth pair in a positional relationship other than the 90° positional relationship with respect to the non-use teeth pair satisfy a relationship of $0 \leq Wa \leq 0.5Wb$.

According to the above-described configuration, since the exciting coil is wound in the directions opposite to each other around the two teeth included in the use teeth pair so as to generate different magnetic poles, the exciting coil generates different magnetic poles in point symmetry. Herein, the magnetic field generated by a magnet of the motor rotor where the same magnetic poles are arranged in point symmetry is superimposed on the magnetic field generated by the exciting coil, and thus a synthetic magnetic field is formed. Induced voltages are generated in the first output coil and the second output coil by the synthetic magnetic field. In two winding parts in the point symmetric positional relationship in the exciting coil, the synthetic magnetic field is strengthened in one winding part, and the synthetic magnetic field is weakened in the other winding part. Induced voltages are strengthened by the synthetic magnetic field in the one winding part and weakened by the synthetic magnetic field in the other winding part. As a result, an induced voltage as a noise generated by the magnetic field of the motor rotor is canceled out. Therefore, even when the magnetic field of the motor rotor where the same magnetic poles are arranged in point symmetry is superimposed on the magnetic field generated by the exciting coil, no electrical error occurs.

Further, according to the above-described configuration, since the non-use teeth pair around which the exciting coil is not wound is provided, the magnetic poles by the exciting coil can be alternately generated along the circumferential direction while the use teeth pairs around which the exciting coil is wound in the directions opposite to each other are provided. In short, a resolver with slots of the number of teeth of sixteen is realized.

Further, according to the above-described configuration, since the number Wa of windings and the number Wb of windings satisfy the relationship of $0 \leq Wa \leq 0.5Wb$, the variation in the total impedance of the exciting coil according to the rotor position can be reduced. Therefore, the variation according to the rotor position in the current flowing through the exciting coil, the magnetic field of the exciting coil, and the output voltages of the resolver can be reduced, and thus the electrical error can be prevented from occurring.

(2) Preferably, among the seven use teeth pairs, five use teeth pairs are first use teeth pairs around which the first output coil is wound, and other two use teeth pairs are second use teeth pairs around which the second output coil is wound. The first output coil is wound in directions opposite to each other around the two teeth included in the first use teeth pair. The second output coil is wound in directions opposite to each other around the two teeth included in the second use teeth pair.

According to the above-described configuration, the first output coil and the second output coil are efficiently arranged while the non-use teeth pair around which the exciting coil is not wound is provided.

(3) Preferably, the rotor is arranged inside the stator.

(4) Preferably, the number Wa of windings and the number Wb of windings satisfy a relationship of $0 < Wa \leq 0.5Wb$.

According to the present invention, no electrical error occurs even when the magnetic field of the motor rotor where the same magnetic poles are arranged in point symmetry is superimposed on the magnetic field generated by the exciting coil. Further, the total impedance of the exciting coil can be prevented from varying according to the rotor position, and the electrical error can be prevented from occurring. Further, the total impedance of the exciting coil can be prevented from varying according to the rotor position.

DESCRIPTION OF EMBODIMENTS

Hereinafter, a preferable embodiment of the present invention is described. It is a matter of course that the embodiment described below is merely an example of the present invention and the embodiment of the present invention can be altered as appropriate insofar as the gist of the present invention is not altered.

[Motor 10]

Figure 1:
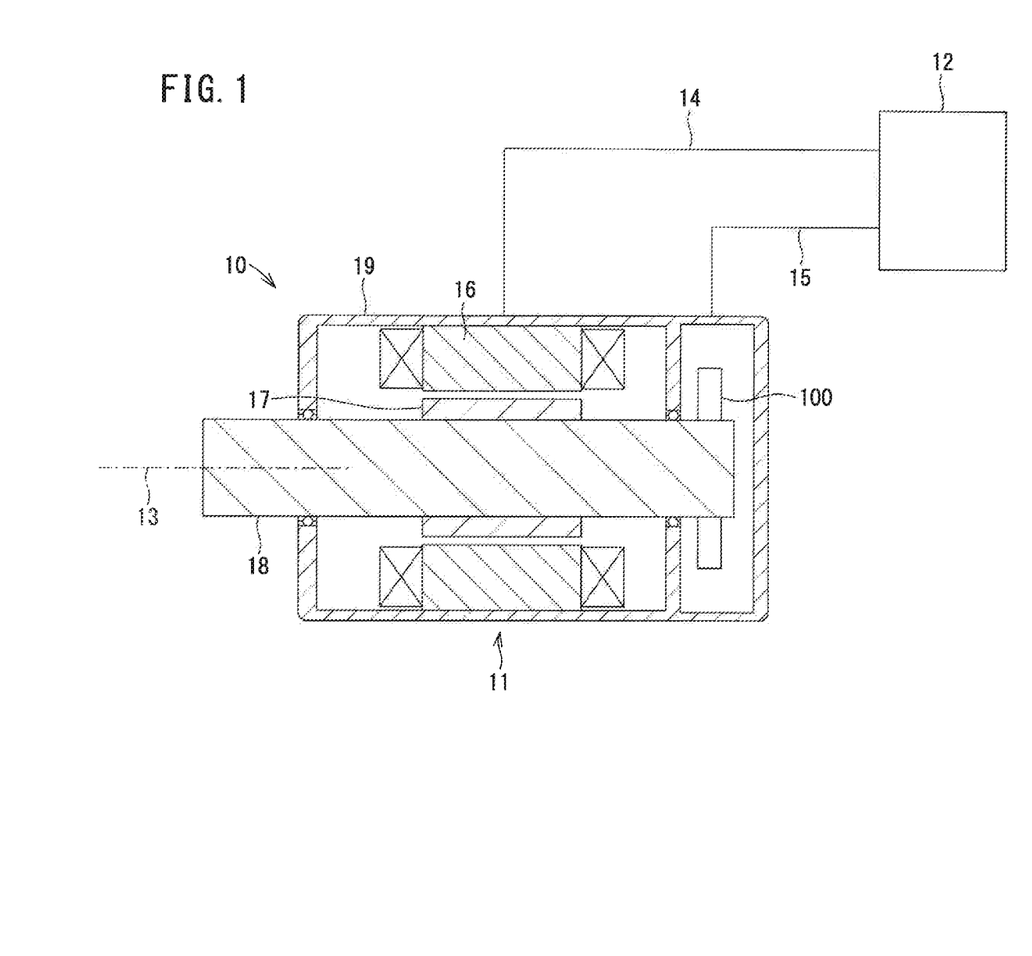
FIG. 1 is a schematic diagram illustrating a configuration of a motor 10 provided with a resolver 100 according to an embodiment of the present invention.

As illustrated in FIG. 1, a resolver 100 according to an embodiment of the present invention is provided in a motor 10. The motor 10 is a brushless motor. The motor 10 is mounted in an electric power steering (EPS), for example. The motor 10 includes a motor body 11 and a control unit 12. The motor body 11 and the control unit 12 are electrically connected by a power cable 14 and a sensor cable 15.

The motor body 11 includes a motor stator 16, a motor rotor 17, a motor shaft 18 fixed to the motor rotor 17, and a casing 19. The motor shaft 18 is provided with the resolver 100. The motor rotor 17 is arranged inside the motor stator 16. The motor 10 is an inner rotor type motor. The motor body 11 and the resolver 100 are arranged in the casing 19.

Figure 2:
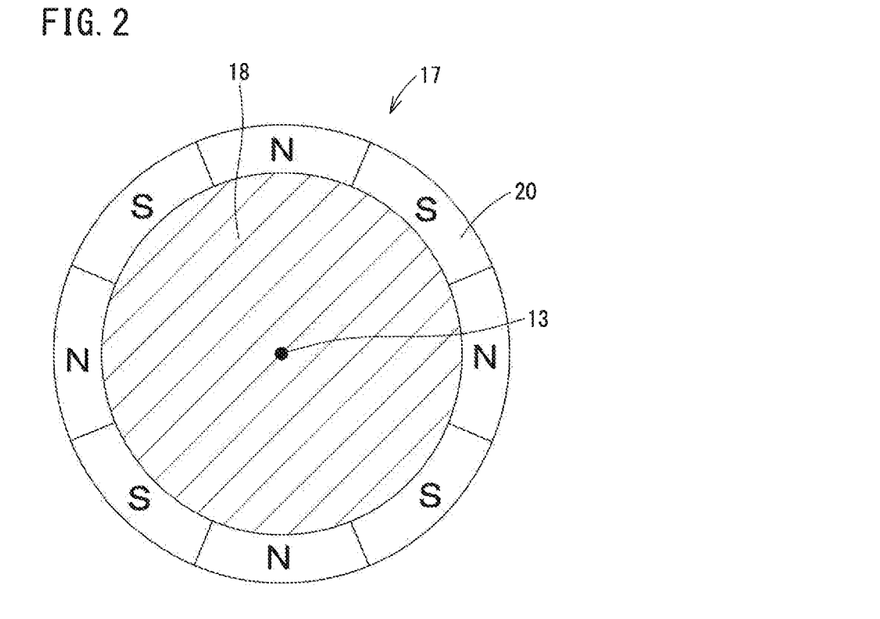
FIG. 2 is a schematic diagram of a motor rotor 17 of the motor 10 provided with the resolver 100 according to the embodiment.

FIG. 2 illustrates the motor rotor 17 of the motor 10. The motor rotor 17 includes an eight-pole magnet 20 fixed to the motor shaft 18. The magnet 20 is a permanent magnet in which magnet particles are sintered in a cylindrical shape. In the magnet 20, N poles and S poles are alternately formed in the circumferential direction. In the magnet 20, the same magnetic poles are arranged in point symmetry.

In the motor 10, the number M of magnetic poles of the motor rotor 17 satisfies a relationship of M=2m, where m is an even number. Since the motor rotor 17 includes the eight-pole magnet 20, the number M of magnetic poles of the motor rotor 17 is 8. Since the number M of magnetic poles is 8, m is 4.

[Resolver 100]

Figure 3:
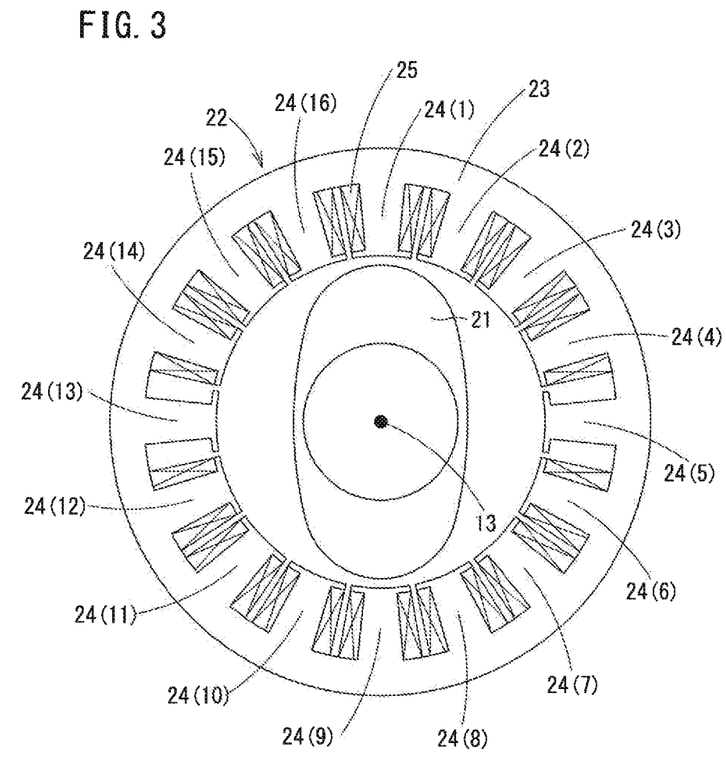
FIG. 3 is a schematic diagram illustrating a configuration of the resolver 100 according to the embodiment.

As illustrated in FIG. 3, the resolver 100 includes a resolver rotor 21 and a resolver stator 22. The resolver 100 is a so-called variable reluctance type resolver. The resolver rotor 21 is arranged inside the resolver stator 22. In short, the resolver 100 is an inner rotor type resolver. The resolver rotor 21 is mounted coaxially with the motor shaft 18.

The resolver rotor 21 is configured by laminating a plurality of non-oriented electric steel plates and fixing the plates by caulking or the like. The outer periphery of the resolver rotor 21 is formed in a shape in which the gap permeance between the resolver rotor 21 and the resolver stator 22 changes like a sine wave with respect to an angle θ in the rotation direction of the resolver rotor 21. The resolver 100 is a 2× resolver. The multiplication factor n of angle of the resolver 100 is two. Therefore, the outer periphery of the resolver rotor 21 is formed such that the same shape is periodically repeated every 180° (360°/2), which is an angle corresponding to the multiplication factor of angle. The resolver rotor 21 has two projections radially projecting from an axial core 13 corresponding to the multiplication factor of angle of two.

As illustrated in FIG. 3, the resolver stator 22 includes a yoke 23, sixteen teeth 24, and a coil group 25. The yoke 23 has a substantially cylindrical shape. The sixteen teeth 24 project from the inner peripheral surface of the yoke 23 toward the axial core 13, and are arranged at equal intervals along the circumferential direction of the yoke 23. The yoke 23 and the sixteen teeth 24 are configured by laminating a plurality of non-oriented electric steel plates and fixing the plates by caulking or the like.

The sixteen teeth 24 include first to sixteenth teeth 24(1) to 24(16) arranged along the circumferential direction of the yoke 23. An i-th tooth 24(i) is a tooth 24 corresponding to an order i from the first tooth 24(1). The order i is a number from 1 to 16. When it is not necessary to distinguish the teeth 24 having different orders, the teeth 24 are used as a generic term.

The sixteen teeth 24 include eight teeth pairs. Each teeth pair includes two teeth 24 in a point symmetric positional relationship with respect to the axial core 13 of the resolver rotor 21. Hereinafter, when j is an integer of 1 or more and 8 or less, a teeth pair including a j-th tooth 24(j) and a (j+8)-th tooth 24(j+8) is referred to as a "j-th teeth pair". For example, a teeth pair including the first tooth 24(1) and the ninth tooth 24(9) is referred to as a "first teeth pair".

Figure 4:
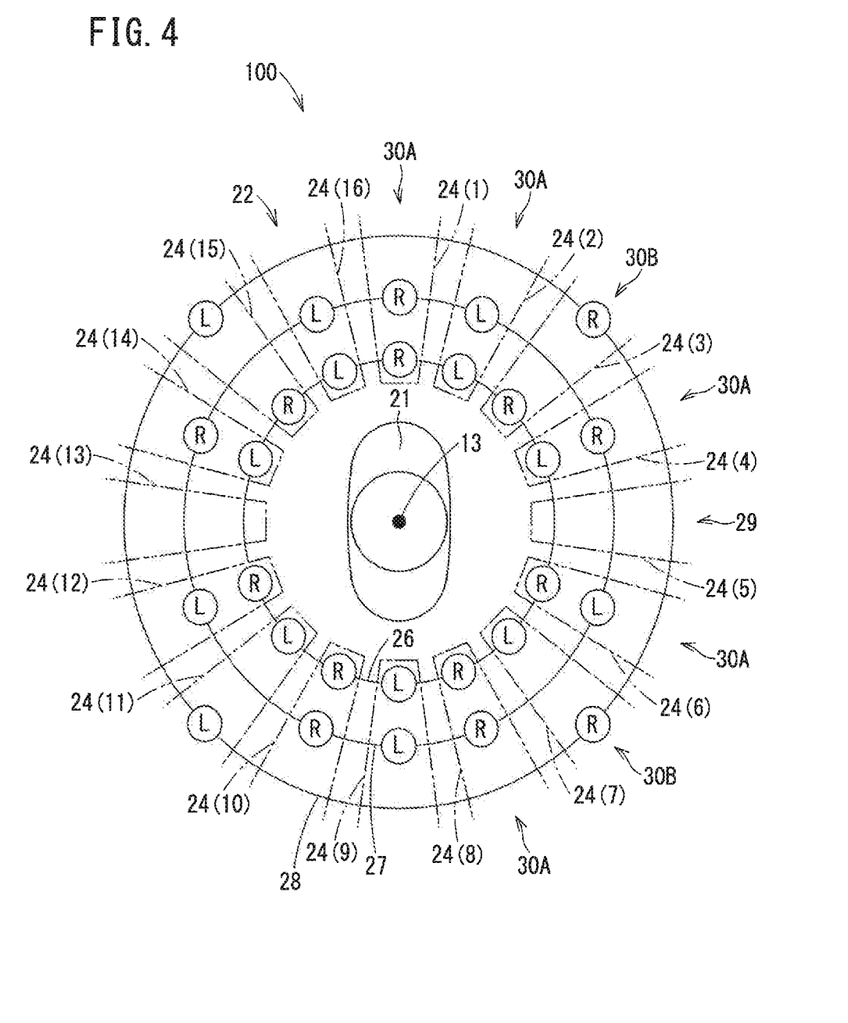
FIG. 4 is a schematic diagram illustrating magnetic poles formed by an exciting coil 26, a first output coil 27, and a second output coil 28 in the resolver 100 according to the embodiment.

The coil group 25 refers to the entirety of the exciting coil 26, the first output coil 27, and the second output coil 28 illustrated in FIG. 4. The coil group 25 is selectively wound around some of the sixteen teeth 24. When a predetermined voltage is applied to the exciting coil 26, a sine wave-like or cosine wave-like output voltage is obtained from each of the first output coil 27 and the second output coil 28. The first output coil 27 and the second output coil 28 are wound such that phases of the output voltages are different from each other. In other words, when the sine wave-like voltage is output from the first output coil 27, the cosine wave-like voltage is output from the second output coil 28, and vice versa. Based on the output voltages of the first output coil 27 and the second output coil 28, the rotation angle of the resolver rotor 21, i.e., the rotation angle of the motor shaft 18, can be detected.

FIG. 4 illustrates the sixteen teeth 24, the exciting coil 26, the first output coil 27, and the second output coil 28. The exciting coil 26, the first output coil 27, and the second output coil 28 each have a plurality of winding parts wound around the teeth 24. In FIG. 4, a circled letter R and a circled letter L indicate winding directions of the winding part of the exciting coil 26 wound around each tooth 24. When the teeth 24 are seen outward from the resolver rotor 21, the winding direction indicated by the letter R is one direction, and the winding direction indicated by the letter L is the other direction. The one direction is a direction opposite to the other direction. For example, the one direction is a clockwise direction, and the other direction is a counterclockwise direction. In the winding parts with the same winding direction, the same magnetic poles are generated. In the winding parts with the different winding directions, different magnetic poles are generated.

Since an alternating voltage is applied to the exciting coil 26, polarities of the magnetic fields generated from the winding parts of the exciting coil 26 are periodically reversed. Therefore, polarities of the magnetic fields generated in the winding parts of the first output coil 27 and the second output coil 28 by mutual induction are also periodically reversed. For example, at a certain moment, N pole magnetic fields are generated in the winding parts in the one direction indicated by the letter R, and S pole magnetic fields are generated in the winding parts in the other direction indicated by the letter L. At another moment, the S pole magnetic fields are generated in the winding parts in the one direction indicated by the letter R, and the N pole magnetic fields are generated in the winding parts in the other direction indicated by the letter L.

Among the eight teeth pairs included in the resolver stator 22, one teeth pair is a non-use teeth pair 29 and seven teeth pairs are use teeth pairs 30. None of the exciting coil 26, the first output coil 27, and the second output coil 28 are wound around the tooth 24 included in the non-use teeth pair 29. The exciting coil 26 is wound zero or more times around the tooth 24 included in the use teeth pairs 30. The fact that the exciting coil 26 is wound zero time means that the exciting coil 26 is not wound, and the fact that the exciting coil 26 is wound zero or more times means that the exciting coil 26 is wound one or more times or the exciting coil 26 is not wound. Among the seven use teeth pairs 30, five use teeth pairs 30 are first use teeth pairs 30A, and the other two use teeth pairs 30 are second use teeth pairs 30B. The first output coil 27 is wound around the tooth 24 included in the first use teeth pair 30A. The second output coil 28 is wound around the tooth 24 included in the second use teeth pair 30B. When it is not necessary to distinguish the first use teeth pair 30A and the second use teeth pair 30B, the use teeth pair 30 is used as a generic term.

As illustrated in FIG. 4, the fifth teeth pair is the non-use teeth pair 29 and the other seven teeth pairs are the use teeth pairs 30. Among the seven use teeth pairs 30, five use teeth pairs 30 are the first use teeth pairs 30A and the other two use teeth pairs 30 are the second use teeth pair 30B. Specifically, among the seven use teeth pairs 30, the first teeth pair, the second teeth pair, the fourth teeth pair, the sixth teeth pair, and the eighth teeth pair are the first use teeth pairs 30A, and the third teeth pair and the seventh teeth pair are the second use teeth pairs 30B.

The exciting coil 26 is wound around each of the fourteen teeth 24 included in the seven use teeth pairs 30. The exciting coil 26 is wound in the one direction indicated by the letter R around the first tooth 24(1), the third tooth 24(3), the sixth tooth 24(6), the eighth tooth 24(8), the tenth tooth 24(10), the twelfth tooth 24(12), and the fifteenth tooth 24(15). The one direction is the clockwise direction when the teeth 24 are seen outward from the resolver rotor 21, for example. The exciting coil 26 is wound in the other direction indicated by the letter L around the second tooth 24(2), the fourth tooth 24(4), the seventh tooth 24(7), the ninth tooth 24(9), the eleventh tooth 24(11), the fourteenth tooth 24(14), and the sixteenth tooth 24(16). The other direction is the counterclockwise direction when the teeth 24 are seen outward from the resolver rotor 21, for example.

The exciting coil 26 is wound in directions opposite to each other around the two teeth 24 included in the use teeth pair 30. For example, in the first teeth pair, the exciting coil 26 is wound in the one direction indicated by the letter R around the first tooth 24(1) and wound in the other direction indicated by the letter L around the ninth tooth 24(9). In the second teeth pair, the exciting coil 26 is wound in the other direction indicated by the letter L around the second tooth 24(2) and wound in the one direction indicated by the letter R around the tenth tooth 24(10).

The exciting coil 26 is wound in directions opposite to each other around the two teeth 24 adjacent to each other along the circumferential direction of the resolver rotor 21, among the fourteen teeth 24 included in the seven use teeth pairs 30. For example, the exciting coil 26 is wound in the one direction indicated by the letter R around the third tooth 24(3) and wound in the other direction indicated by the letter L around the fourth tooth 24(4). The winding direction in the third tooth 24(3) is opposite to the winding direction in the fourth tooth 24(4). The exciting coil 26 is wound in the one direction indicated by the letter R around the sixth tooth 24(6). Regarding the fourth tooth 24(4) and the sixth tooth 24(6) between which the non-use teeth pair 29 is interposed, the winding direction in the fourth tooth 24(4) is opposite to the winding direction in the sixth tooth 24(6).

The first output coil 27 is wound in directions opposite to each other around the two teeth 24 included in the first use teeth pair 30A. In the first teeth pair, the first output coil 27 is wound in the one direction indicated by the letter R around the first tooth 24(1) and wound in the other direction indicated by the letter L around the ninth tooth 24(9). In the second teeth pair, the first output coil 27 is wound in the other direction indicated by the letter L around the second tooth 24(2) and wound in the one direction indicated by the letter R around the tenth tooth 24(10). In the fourth teeth pair, the first output coil 27 is wound in the one direction indicated by the letter R around the fourth tooth 24(4) and wound in the other direction indicated by the letter L around the twelfth tooth 24(12). In the sixth teeth pair, the first output coil 27 is wound in the other direction indicated by the letter L around the sixth tooth 24(6) and wound in the one direction indicated by the letter R around the fourteenth tooth 24(14). In the eighth teeth pair, the first output coil 27 is wound in the one direction indicated by the letter R around the eighth tooth 24(8) and wound in the other direction indicated by the letter L around the sixteenth tooth 24(16).

The second output coil 28 is wound in directions opposite to each other around the two teeth 24 included in the second use teeth pair 30B. In the third teeth pair, the second output coil 28 is wound in the one direction indicated by the letter R around the third tooth 24(3) and wound in the other direction indicated by the letter L around the eleventh tooth 24(11). In the seventh teeth pair, the second output coil 28 is wound in the one direction indicated by the letter R around the seventh tooth 24(7) and wound in the other direction indicated by the letter L around the fifteenth tooth 24(15).

Among the seven use teeth pairs 30, the first teeth pair is in a 90° positional relationship with respect to the fifth teeth pair, which is the non-use teeth pair 29. The number of windings of the exciting coil 26 wound around the tooth 24 included in the use teeth pair 30 in the 90° positional relationship with respect to the non-use teeth pair 29 is referred to as Wa.

Among the seven use teeth pairs 30, the second teeth pair, the third teeth pair, the fourth teeth pair, the sixth teeth pair, the seventh teeth pair, and the eighth teeth pair are in a positional relationship other than the 90° positional relationship with respect to the fifth teeth pair, which is the non-use teeth pair 29. The number of windings of the exciting coil 26 wound around the tooth 24 included in the use teeth pair 30 in the positional relationship other than the 90° positional relationship with respect to the non-use teeth pair 29 is referred to as Wb.

The resolver rotor 21 is configured such that the number Wa of windings of the exciting coil 26 wound around the tooth 24 included in the use teeth pair 30 in the 90° positional relationship with respect to the non-use teeth pair 29 and the number Wb of windings of the exciting coil 26 wound around the tooth 24 included in the use teeth pair 30 in the positional relationship other than the 90° positional relationship with respect to the non-use teeth pair 29 satisfy a relationship of $0 \leq Wa \leq 0.5Wb$.

The first teeth pair includes two teeth 24. The numbers Wa of windings of the exciting coil 26 wound around these two teeth 24 are the same. The second teeth pair, the third teeth pair, the fourth teeth pair, the sixth teeth pair, the seventh teeth pair, and the eighth teeth pair include twelve teeth 24 in total. The numbers Wb of windings of the exciting coil 26 wound around these twelve teeth 24 may be all the same, or some of the numbers Wb of windings may be different.

Figure 5:
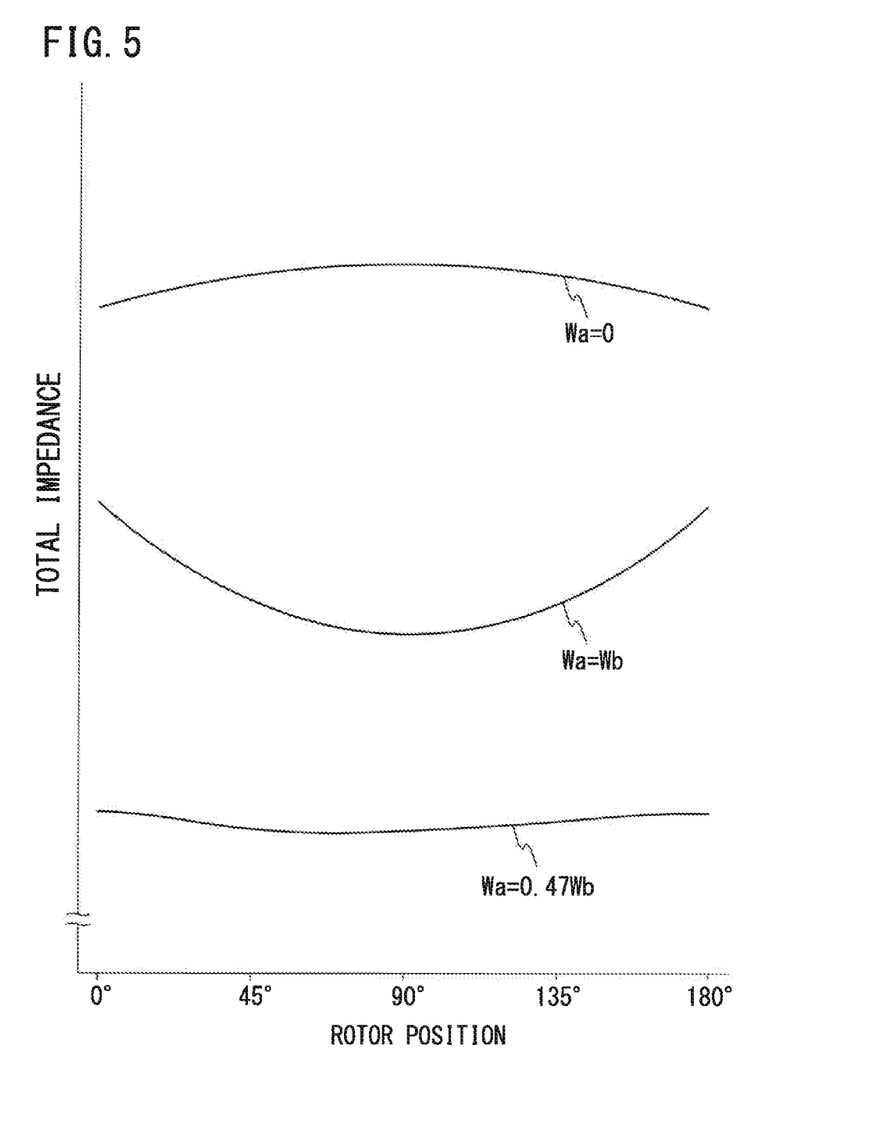
FIG. 5 is a diagram for explaining effects of the resolver 100 according to the embodiment.

Effects of the resolver 100 are described with reference to FIG. 5. FIG. 5 illustrates states where the total impedance of the exciting coil 26 varies according to the rotor position in the cases of Wa=Wb, Wa=0.47Wb, and Wa=0. In the case of Wa=Wb, the variation amount of the total impedance of the exciting coil 26 according to the rotor position is large. In contrast thereto, in the cases of Wa=0.47Wb and Wa=0, the variation amount of the total impedance of the exciting coil 26 according to the rotor position is small, and it can be said that the total impedance of the exciting coil 26 hardly varies according to the rotor position.

[Operational Effects of Embodiment]

According to the resolver 100 of the above-described embodiment, since the exciting coil 26 is wound in the directions opposite to each other around the two teeth 24 included in the use teeth pair 30 so as to generate different magnetic poles, the exciting coil 26 generates different magnetic poles in point symmetry. Herein, the magnetic field generated by the magnet 20 of the motor rotor 17 where the same magnetic poles are arranged in point symmetry is superimposed on the magnetic field generated by the exciting coil 26, and thus a synthetic magnetic field is formed. Induced voltages are generated in the first output coil 27 and the second output coil 28 by the synthetic magnetic field. In the two winding parts in the point symmetric positional relationship in the exciting coil 26, the synthetic magnetic field is strengthened in one winding part, and the synthetic magnetic field weakened in the other winding part. The induced voltages are strengthened by the synthetic magnetic field in the one winding part and weakened by the synthetic magnetic field in the other winding part. As a result, an induced voltage as a noise generated by the magnetic field of the motor rotor 17 is canceled out. Therefore, even when the magnetic field of the motor rotor 17 where the same magnetic poles are arranged in point symmetry is superimposed on the magnetic field generated by the exciting coil 26, no electrical error occurs.

Further, since the non-use teeth pair 29 around which the exciting coil 26 is not wound is provided, the magnetic poles by the exciting coil 26 can be alternately generated along the circumferential direction while the use teeth pairs 30 where the exciting coil 26 is wound in the directions opposite to each other are provided. In short, a resolver with slots of the number of teeth of sixteen is realized.

Further, since the number Wa of windings and the number Wb of windings satisfy the relationship of $0 \leq Wa \leq 0.5Wb$, the variation in the total impedance of the exciting coil 26 according to the rotor position can be reduced. Therefore, even when the multiplication factor of angle is two, the variation according to the rotor position in the current flowing through the exciting coil, the magnetic field of the exciting coil, and the output voltages of the resolver can be reduced, and thus the electrical error can be prevented from occurring.

Further, the first output coil 27 and the second output coil 28 are efficiently arranged while the non-use teeth pair 29 around which the exciting coil 26 is not wound is provided.

Modification Example

Although an embodiment of the present invention is described in detail above, the description above is merely an example of the present invention in all respects. It is a matter of course that various improvements or modifications can be made without deviating from the scope of the present invention. With respect to the constituent components of the resolver 100 according to the above-described embodiment, the constituent components may be omitted, replaced, or added as appropriate according to embodiments. Further, the shape and the size of the constituent components of the resolver 100 described above may be appropriately set according to embodiments.

The resolver according to the above-described embodiment is an inner rotor type resolver where the resolver rotor is arranged inside the resolver stator. The resolver may be a resolver where the resolver rotor is arranged outside the resolver stator. In this case, a motor provided with the resolver is also an outer rotor type motor.

The resolver according to the above-described embodiment is configured such that the number Wa of windings and the number Wb of windings satisfy the relationship of $0 \leq Wa \leq 0.5Wb$. A resolver according to a modification example may be configured such that the number Wa of windings and the number Wb of windings satisfy a relationship of $0 < Wa \leq 0.5Wb$.

DESCRIPTION OF REFERENCE NUMERALS 17 motor rotor
20 magnet
21 resolver rotor
22 resolver stator
24 tooth
26 exciting coil
27 first output coil
28 second output coil
29 non-use teeth pair
30 use teeth pair
30A first use teeth pair
30B second use teeth pair
100 resolver

The invention claimed is:

1. A variable reluctance type resolver provided in a motor in which a number M of magnetic poles of a motor rotor satisfies a relationship of M=2m, m being an even number, and having a multiplication factor of angle of two, the variable reluctance type resolver comprising:

a rotor mounted coaxially with a motor shaft;

a stator having sixteen teeth; and an exciting coil, a first output coil, and a second output coil selectively wound around the sixteen teeth, wherein the sixteen teeth include eight teeth pairs, each of the teeth pairs includes two teeth in a point symmetric positional relationship with respect to an axial core of the rotor, among the eight teeth pairs, one teeth pair is a non-use teeth pair around which the exciting coil is not wound, and other seven teeth pairs are use teeth pairs around which the exciting coil is wound, the exciting coil is wound in directions opposite to each other around the two teeth included in the use teeth pair so as to generate different magnetic poles, the exciting coil is wound in directions opposite to each other around two teeth adjacent to each other along a circumferential direction of the axial core, among the teeth included in the use teeth pairs, and a number Wa of windings of the exciting coil wound around the tooth included in the use teeth pair in a 90° positional relationship with respect to the non-use teeth pair and a number Wb of windings of the exciting coil wound around the tooth included in the use teeth pair in a positional relationship other than the 90° positional relationship with respect to the non-use teeth pair satisfy a relationship of $0 < Wa \leq 0.5Wb$.

2. The variable reluctance type resolver according to claim 1, wherein among the seven use teeth pairs, five use teeth pairs are first use teeth pairs around which the first output coil is wound, and other two use teeth pairs are second use teeth pairs around which the second output coil is wound, the first output coil is wound in directions opposite to each other around the two teeth included in the first use teeth pair, and the second output coil is wound in directions opposite to each other around the two teeth included in the second use teeth pair.

3. The variable reluctance type resolver according to claim 2, wherein the rotor is arranged inside the stator.

4. The variable reluctance type resolver according to claim 1, wherein the rotor is arranged inside the stator.

* * * * *